Figure 1:
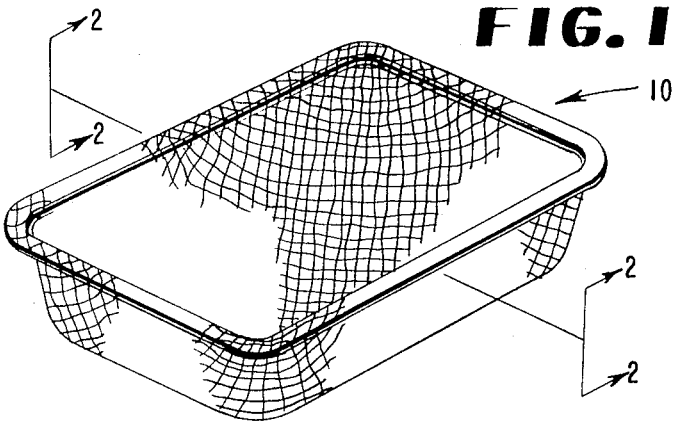
Figure 2:
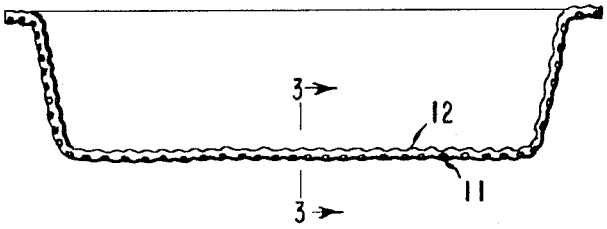
Figure 3:
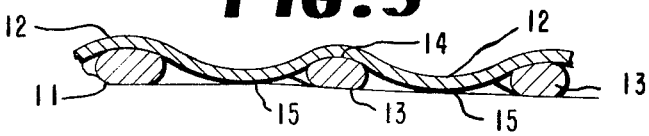
Figure 4:
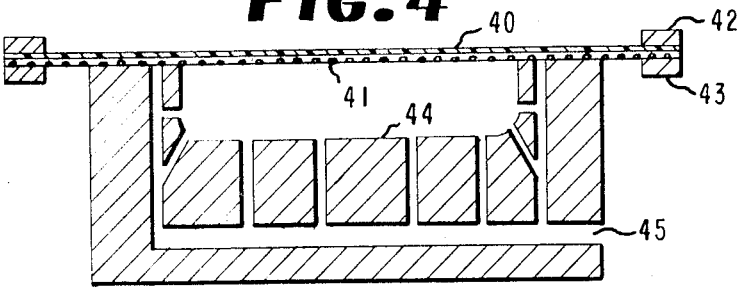
Figure 5:
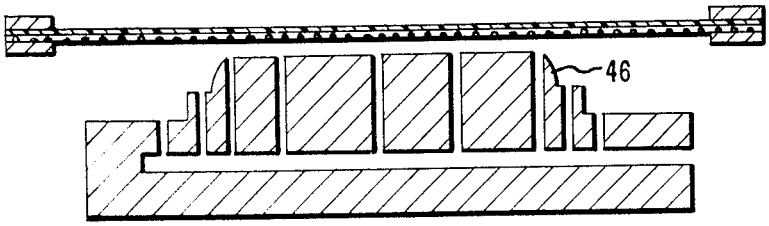

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 17, 1973

909 O.G. 794

T909,015

PLASTIC CONTAINER

James Thomas Pecka, Florence, S.C., assignor to E. I. du Pont de Nemours and Company, Wilmington, Del.

Continuation of abandoned application Ser. No. 111,263, Feb. 1, 1971. This application Mar. 10, 1972, Ser. No. 233,484

**Int. Cl. B32b *1/00***

U.S. Cl. 161—89

1 Sheet Drawing. 10 Pages Specification

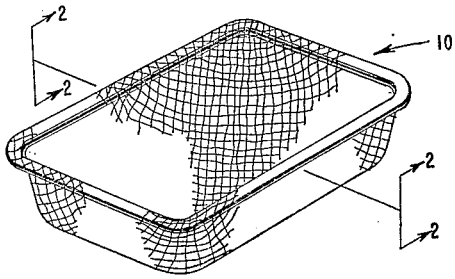

A thermoplastic container comprising a thermally formed thermoplastic netting member or first shell and a thermoplastic film member or second shell in contour-conforming configuration with and adhered to the netting member and in surface-surrounding relationship to its strands. The container is particularly useful for dispensing food products from vending machines since it can be subjected to electronic, convective or radiant heating.

April 17, 1973 J. T. PECKA T909,015

PLASTIC CONTAINER

Original Filed Feb. 1, 1971

INVENTOR
JAMES THOMAS PECKA

BY Hoge O. Sutherland

ATTORNEY